J. J. TILLINGHAST.
Lunch-Pail.
No. 216,632.      Patented June 17, 1879
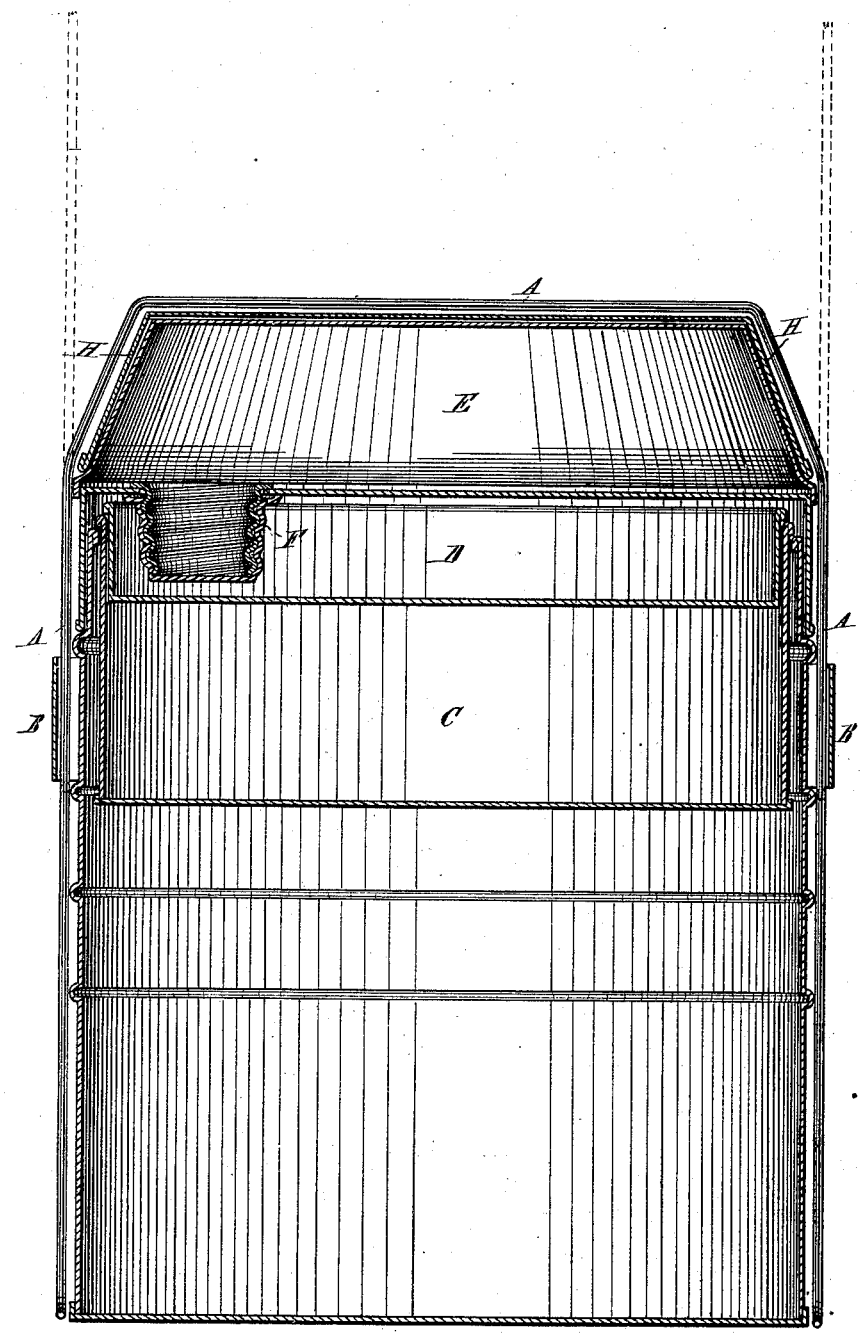

UNITED STATES PATENT OFFICE.

JOSEPH J. TILLINGHAST, OF TROY, NEW YORK.

IMPROVEMENT IN LUNCH-PAILS.

Specification forming part of Letters Patent No. 216,632, dated June 17, 1879; application filed April 2, 1879.

*To all whom it may concern:*

Be it known that I, JOSEPH J. TILLINGHAST, of the city of Troy, county of Rensselaer, and State of New York, have invented certain new and useful Improvements in Lunch-Pails, of which the following is a full, clear, and exact description, reference being had to the accompanying drawing and letters of reference marked thereon, which form a part of this specification.

The nature of my invention consists in constructing a lunch-pail with various compartments or dishes, and with a coffee-reservoir forming the cover of such pail, and with a slip-bail; my object being to form a lunch-pail having separate compartments for bread and butter, meats and vegetables, and pastry, and with the coffee-reservoir at the top of the pail, and so constructed as to be readily heated upon a stove without removing the coffee, and with a slip-bail which can be pushed closely down to the top, thus making a compact and complete lunch-pail.

I am aware that lunch-pails of different kinds have been made with compartments and sold upon the market; but I am not aware that a lunch-pail has ever been made having a coffee-reservoir at the top and forming the cover of the pail, nor having a slip-bail, which are the distinctive features of my invention.

The coffee-reservoir is placed at the top of the pail, instead of at the bottom, as in ordinary lunch-pails, so that the heat therefrom will not be so likely to melt the butter, which is generally placed in the lower compartment of the pail.

The bail is made to slip through the eyes, close down upon the covers, so as to aid in holding the cover in place and allow the pails to be more closely packed in cases for transportation.

The drawing represents the pail with the bail A pushed down. This bail is made to conform to the contour of the top part of the pail. Each outer end of the bail is bent out at right angles to make a stop, and to catch under the eyes B B, secured to the sides of the pail, and through which the bail will slip up and down.

C is the meat and vegetable dish, and the lowest one in the pail, and is sustained by a bead around its upper edge, which rests upon the top edge of the body of the pail, thereby preventing it from slipping down to the bottom of the pail.

D is the pastry-dish, set within dish C, but is prevented from slipping to the bottom of it by a similar bead around its upper edge, which rests upon the top edge of dish C.

E is the coffee-reservoir, having a rim or flange to shut over the top of the pail, and having an opening into the reservoir on the under side, and fitted with a screw-cap, F. The opposite side is struck up from a single piece of metal, and, having no soldered seams, can therefore be set upon the stove for heating the coffee.

Over the coffee-reservoir may be placed the drinking-cup H.

All the different parts fit together closely, and when the bail is pushed down upon the top part make a compact and secure lunch-pail.

What I claim as my invention, and desire to secure by Letters Patent, is—

1. In a lunch-pail, the sliding bail A, formed of a single piece of metal to conform to the shape of the pail, passing through eyes B, and having the stops at either end, whereby it may be used to carry the pail, or may be pressed down to hold the parts compactly and securely together, as set forth.

2. A lunch-pail having a coffee-reservoir, E, provided with a rim or flange adapted to fit over the top of the body of the pail and form a cover therefor, and having the opening into the reservoir on the under side fitted with a screw-cap, F, substantially as and for the purpose set forth.

In witness whereof I have hereto set my hand this 29th day of March, 1879.

JOSEPH J. TILLINGHAST.

Witnesses:
N. DAVENPORT,
CHAS. R. SEARLE.